(12) United States Patent
Liu et al.

(10) Patent No.: US 12,215,999 B2
(45) Date of Patent: Feb. 4, 2025

(54) MEASUREMENT DEVICE

(71) Applicant: WISTRON CORP., New Taipei (TW)

(72) Inventors: Yu-Ju Liu, New Taipei (TW); Chia Ming Liang, New Taipei (TW); Chin-Kun Tsai, New Taipei (TW)

(73) Assignee: WISTRON CORP., New Taipei (TW)

( * ) Notice: Subject to any disclaimer, the term of this patent is extended or adjusted under 35 U.S.C. 154(b) by 376 days.

(21) Appl. No.: 17/726,607

(22) Filed: Apr. 22, 2022

(65) Prior Publication Data

US 2023/0221169 A1 Jul. 13, 2023

(30) Foreign Application Priority Data

Jan. 7, 2022 (TW) .................................. 111100743

(51) Int. Cl.
  *G01G 19/52* (2006.01)
  *G01J 5/00* (2022.01)
  *G01J 5/0802* (2022.01)

(52) U.S. Cl.
  CPC ............ *G01G 19/52* (2013.01); *G01J 5/0037* (2013.01); *G01J 5/0802* (2022.01)

(58) Field of Classification Search
  CPC ........ G01G 19/52; G01G 21/22; G01G 11/30; G01J 5/0037; G01J 5/0802; G01D 21/02
  USPC ....................................................... 177/245
  See application file for complete search history.

(56) References Cited

U.S. PATENT DOCUMENTS

| | | | | |
|---|---|---|---|---|
| 7,354,195 | B2 * | 4/2008 | Sakano ................. | G01K 1/024 374/E1.004 |
| 9,538,927 | B2 * | 1/2017 | Thaveeprungsriporn ................... | G01N 21/3151 |
| 9,622,690 | B2 * | 4/2017 | Terashima .......... | A61M 5/1723 |
| 11,092,509 | B1 | 8/2021 | Langley et al. | |
| 2017/0067774 | A1 * | 3/2017 | Gough ................. | A61G 7/0527 |

FOREIGN PATENT DOCUMENTS

TW M573200 U 1/2019

OTHER PUBLICATIONS

EP Office Action dated Nov. 18, 2022 in EP application No. 22181359.5-1001.
TW Office Action dated Jun. 22, 2022 in Taiwan application No. 111100743.

\* cited by examiner

*Primary Examiner* — Jacques M Saint Surin
(74) *Attorney, Agent, or Firm* — McClure, Qualey & Rodack, LLP (57) ABSTRACT

A measurement device includes a base, a platform, a temperature sensor, and a weighing component. The platform is movably disposed on the base. The temperature sensor is disposed on the base or the platform. The weighing component is accommodated in the base. The platform has a weight-measuring area and a temperature-measuring area which is located within the weight-measuring area and corresponding to the temperature sensor.

17 Claims, 6 Drawing Sheets

MEASUREMENT DEVICE

CROSS-REFERENCE TO RELATED APPLICATIONS

This non-provisional application claims priority under 35 U.S.C. § 119(a) on Patent Application No(s). 111100743 filed in Taiwan (R.O.C.) on Jan. $7^{th}$, 2022, the entire contents of which are hereby incorporated by reference.

TECHNICAL FIELD

The disclosure relates to a measurement device, more particularly to a measurement device capable of measuring temperature and weight.

BACKGROUND

To the shops that serve beverages, such as coffee, milk, tea, or chocolate, they might need to accurately control the relationship between the temperature and weight of their products in order to offer the same quality of each specific flavor.

Taking coffee shops as an example, a coffee shop generally has a coffee machine that can efficiently produce various sizes of hot and cold coffee drinks according to common demand for coffee flavors. Once or more than twice a day, the staff has to use the coffee machine to produce every coffee drink in order to make sure that the quality of each coffee drink is consistent. Typically, this process involves steps of placing the product on a weighing scale, putting a temperature probe, and cleaning the temperature probe before measuring the next drink, thereby becoming a routine and heavy burden of work.

SUMMARY

Accordingly, one aspect of the disclosure is to provide a measurement device capable of measuring temperature and weight at the same time so as to simplify associated routine process.

One embodiment of the disclosure provides a measurement device including a base, a platform, a temperature sensor, and a weighing component. The platform is movably disposed on the base. The temperature sensor is disposed on the base or the platform. The weighing component is accommodated in the base. The platform has a weight-measuring area and a temperature-measuring area which is located within the weight-measuring area and corresponding to the temperature sensor.

According to the measurement device as discussed in the above embodiments of the disclosure, the temperature sensor has a temperature-measuring area that covers the weight-measuring area of the platform, thus the temperature sensor is able to measure the temperature of the object being placed on the platform while the weighing component is measuring the weight of the object. That is, as an object is placed in the weight-measuring area, the weighing component and the temperature sensor are able to measure the weight and temperature of the object at the same time. Thus, there is no need to neither additionally prepare a temperature sensor nor clean temperature sensor, avoiding troublesome processes during routine work.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "mounted," "connected," and variations thereof are used broadly and encompass both direct and indirect mountings and connections. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities.

Figure 1:
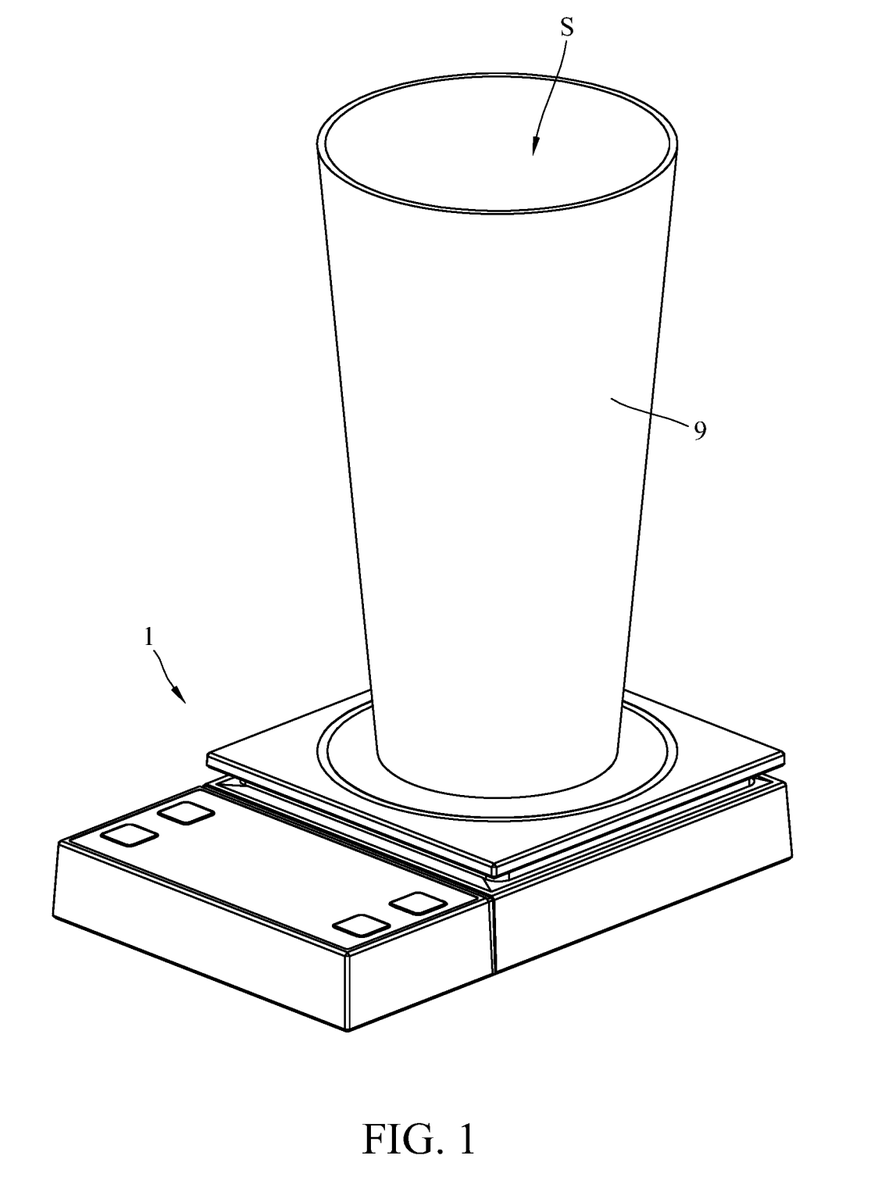
FIG. 1 is a perspective view of a measurement device according to one embodiment of the disclosure when a container is placed thereon.

Firstly, referring to FIG. 1, one embodiment of the disclosure provides a measurement device 1, the measurement device 1 is suitable for supporting a container 9 (also called "object to be measured" hereinafter), and the measurement device 1 is also able to measure the temperature and weight of substance 90 (e.g., coffee, milk, tea, chocolate, or other beverage) accommodated within the container 9. The container 9 may be any typical cup used for holding liquid substance. The container 9 may be, but is not limited to, made of any suitable material, such as plastic, paper, ceramic, or metal. It is noted that the shape, size, and material of the container 9 are exemplary but not intended to limit the disclosure.

Please further refer to FIGS. 2-6, in this embodiment, the measurement device 1 may include a base 10, a temperature sensor TS, a weighing component 16, and a platform 20. The base 10 is the part of the measurement device 1 suitable for being placed on desk or table, and the base 10 is configured to accommodate the temperature sensor TS and the weighing component 16. In one embodiment, the base 10 includes a first casing 11 and a second casing 12 assembled to each other. In other embodiment, the base of the measurement device may be integrally formed of a single piece.

The base 10 of the measurement device 1 may contain one or more batteries therein (not shown). In this case, the base 10 may further include a battery lid 13 detachably installed on the second casing 12, but the disclosure is not limited thereto. In addition, optionally, one or more foot pads FP may be attached on the outer surface of the second casing 12, the foot pads FP may be made of rubber or silicone so as to avoid friction between the measurement device 1 and desk and to stop the measurement device 1 from slipping.

The platform 20 is movably arranged on the base 10 and is able to support object whose temperature and weight needed to be measured (e.g., the container 9). Specifically, the platform 20 is movably disposed above the first casing 11 of the base 10, and the platform 20 will be moved towards the first casing 11 when a load is applied thereon.

The motion of the platform 20 relatives to the first casing 11 causes the weighing component 16 to move. Specifically, the weighing component 16 includes a movable end 161 and a fixed end 162 located opposite to each other, and the platform 20 is connected to the movable end 161. When an object to be measured is placed on the platform 20 to cause the platform 20 to move towards the base 10, the platform 20 causes the movable end 161 to move or cause the weighing component 16 to deform, such that the associated electronic elements (not shown) in the base 10 are able to determine the weight of the object according to the movement or deformation of the weighing component 16. In one example, the movable end 161 of the weighing component 16 may have a movable range of about 2 millimeters. In one embodiment, the platform 20 has a weight-measuring area WA, the weight-measuring area WA generally indicates an effective area of the platform 20 that is predetermined to support and measure the weight of the object to be measured, thus, the container 9 is expected to be placed in the weight-measuring area WA.

Optionally, in this embodiment, the first casing 11 may have a stopping structure 111 protruding towards the platform 20 so as to limit the maximum movable range of the platform 20 towards the base 10, preventing the platform 20 from overly moving towards the base 10. In one embodiment, the stopping structure 111 may have a height of about 1.5 millimeters.

Optionally, in this embodiment, the measurement device 1 may further include a metal support 15 arranged on or embedded at the platform 20 so as to reinforce the platform 20. In one embodiment, the platform 20 is connected to the movable end 161 of the weighing component 16 via the metal support 15.

The temperature sensor TS may be disposed on a circuit board P. The temperature sensor TS is configured to measure the temperature of the object being placed on the platform 20. In one embodiment, the temperature sensor TS may be any suitable infrared thermometer so that the temperature sensor TS is able to measure the temperature of the object being placed on the platform 20 without actually contacting it. The temperature sensor TS may correspond to the weight-measuring area WA of the platform 20. For example, the temperature sensor TS is located adjacent to or corresponding to the central part of the weight-measuring area WA of the platform 20. The central part of the weighting area WA generally indicates an area overlapping the geometric center of the weight-measuring area WA.

As shown, the platform 20 may have a temperature-measuring area TA located within the weight-measuring area WA. As shown, the temperature-measuring area TA is smaller than the weight-measuring area WA, and the temperature-measuring area TA corresponds to the temperature sensor TS. The temperature-measuring area TA generally indicates an area of the platform 20 that is for the temperature sensor TS to effectively measure the temperature of the object being supported on the platform 20. To allow the temperature sensor TS located at one side of the platform 20 to measure the object located at the other side of the platform 20, the measurement device 1 may include a light-permeable piece TF and the platform 20 may have a through hole H located at the temperature-measuring area TA. In specific, the through hole H may define the temperature-measuring area TA and expose the temperature sensor TS; in other words, the platform 20 has a through hole H at the central part of the weight-measuring area WA to expose the temperature sensor TS.

The light-permeable piece TF may be served as a filter to filter specific range of wavelengths. The light-permeable piece TF may be arranged on or embedded at the platform 20 and overlap with the through hole H. Thus, the light-permeable piece TF may be located above the temperature sensor TS. Specifically, the platform 20 has a supporting portion 21 being a recess located at the outer surface of the platform 20 and connected to the through hole H, the supporting portion 21 is configured to accommodate the light-permeable piece TF. As shown, the light-permeable piece TF is arranged on the supporting portion 21 so that the light-permeable piece TF overlaps with the through hole H and is arranged above the temperature sensor TS. As shown, the supporting portion 21 allows an upper surface of the light-permeable piece TF to align with an upper surface of the platform 20. The supporting portion 21 may be larger than the through hole H; in other words, the through hole H is smaller than the light-permeable piece TF. As such, the light-permeable piece TF is held at one end of the through hole H. Due to the light-permeable piece TF and the through hole H, the thermal radiation emitted by the object being placed on the platform 20 can be captured by the temperature sensor TS. It is noted that the through hole H is optional. In an embodiment that the platform does not have the aforementioned through hole, the platform may be made of light-permeable material.

In addition, as shown, in a normal direction N of the platform 20, the temperature sensor TS may overlap with the weighing component 16. Specifically, as shown, SR denotes an effective sensing range of the temperature sensor TS, the sensing range SR has an effective temperature-measuring distance D along the normal direction N of the platform 20, the sensing range SR covers the temperature-measuring area TA, and the sensing range SR and its effective temperature-measuring distance D at least reach the object (e.g., the substance 90 in the container 9 or the accommodation space S of the container 9), thus the temperature sensor TS is able to effectively measure the temperature of the substance 90.

Optionally, the measurement device 1 may further include an insulation wall W arranged in the base 10 to surround at least part of the temperature sensor TS so as to prevent ambient temperature from affecting the temperature sensor TS.

Figure 6:
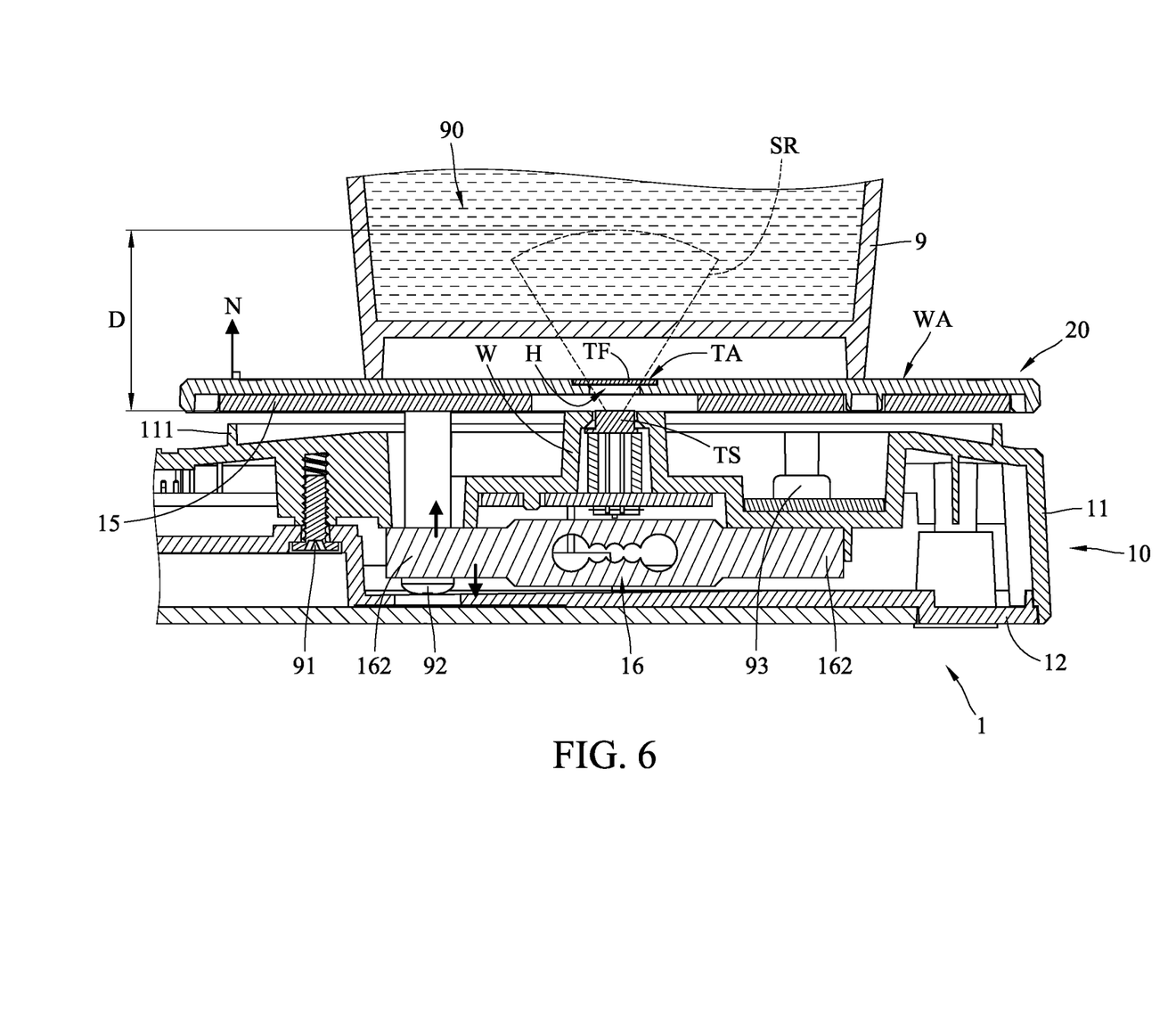
FIG. 6 depicts a cross-sectional view of the measurement device in FIG. 1 when measuring temperature and weight.

According to the configuration of the measurement device 1 as discussed above, when the container 9 is placed on the weight-measuring area WA of the platform 20, the weighing component 16 is able to measure the weight of the substance 90 and the temperature sensor TS is able to measure the temperature of the substance 90, such that there is no need to neither additionally prepare a temperature sensor nor clean temperature sensor, avoiding troublesome processes during routine work.

The temperature sensor TS may have a predetermined sampling frequency that allows the temperature sensor TS to capture the variation of temperature during a specific time interval for the purpose of determining whether the temperature variation becomes stable or less than a predetermined value, such that a processor (not shown) being connected to the temperature sensor TS is able to determine the temperature of the substance 90 based on the result of the temperature sensor TS.

Optionally, the temperature sensor TS begins to operate once the measurement device 1 is turned on, but the disclosure is not limited thereto. In another embodiment, the temperature sensor TS begins to operate when the weighing component experiences load; in other words, the temperature sensor TS begins to measure temperature as the weighing component is activated, thus the temperature sensor TS is off when not in use and thereby saving energy consumption of the measurement device 1.

Figure 2:
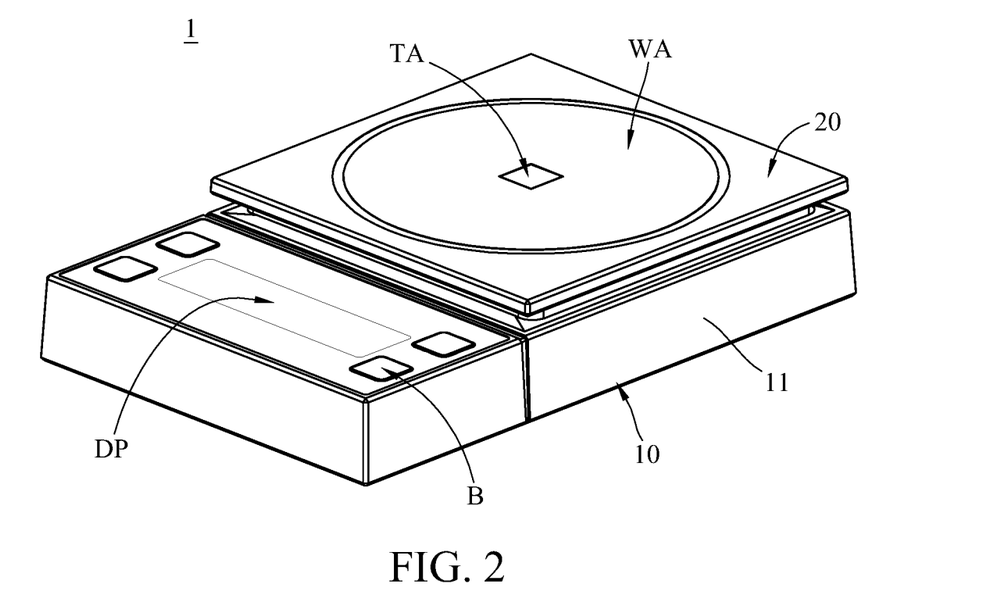
FIG. 2 is a perspective view of the measurement device in FIG. 1.
Figure 3:
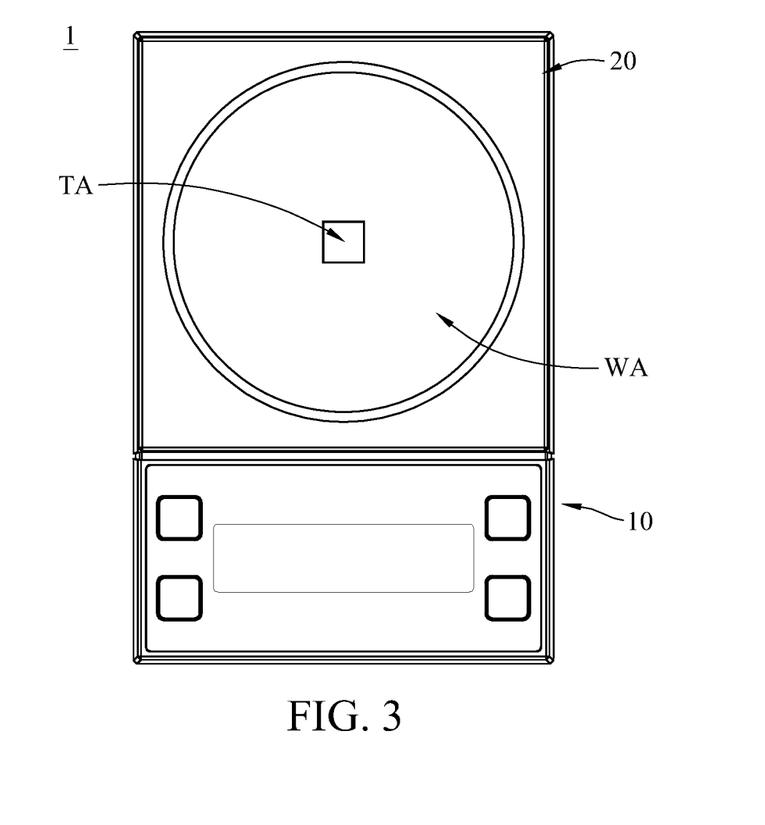
FIG. 3 is a top view of the measurement device in FIG. 1.
Figure 4:
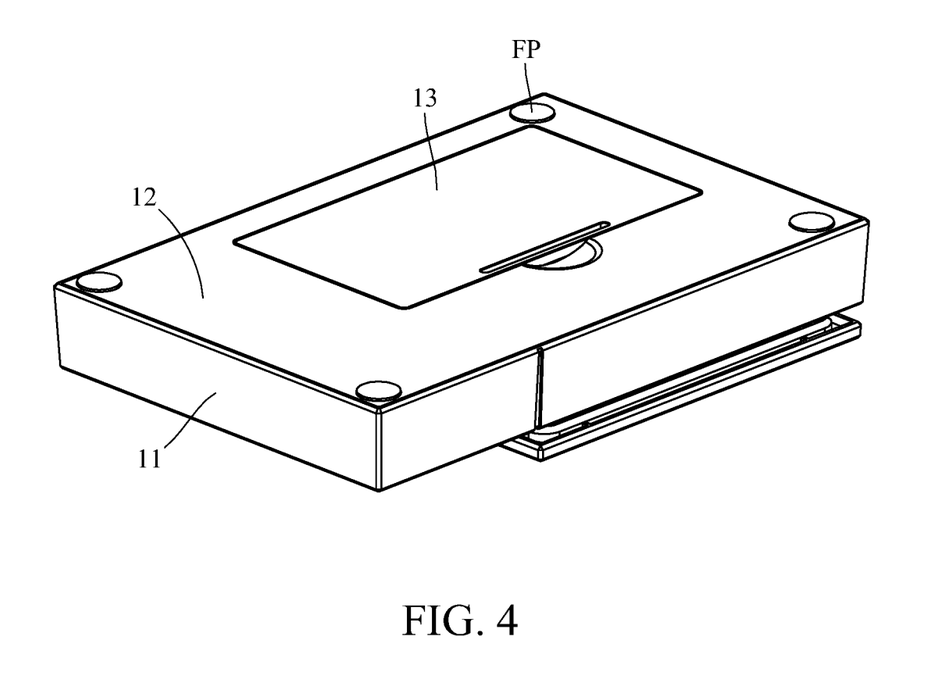
FIG. 4 is a bottom view of the measurement device in FIG. 1.

Optionally, the measurement device 1 may further include at least one button B and a display panel DP arranged on the first casing 11, the button B and/or the display panel DP may each be an interactive element that allows user to get expected interactive feedback from the measurement device 1 following a particular command. For example, the user is allowed to set up or define the data about the object to be measured using the button, and the display panel DP is able to display the values (i.e., the temperature and weight) of the object. The display panel DP may also display the result of whether the obtained values meet the predetermined temperature and weight.

It is noted that different types of beverage have different requirements for weights, thus the distance between the platform 20 and the temperature sensor TS may vary depending on the load applied on the platform 20; in other words, the distance between the platform 20 and the temperature sensor TS is not fixed or is changeable. Even so, the maximum movable range of the platform 20 still fall within the effective temperature-measuring distance D of the temperature sensor TS. Thus, regardless of the type of the substance 90 accommodated within the container 9, the temperature sensor TS is still able to measure the temperature of the substance 90.

Optionally, the associated electronic elements (not shown, such as memory, processor) in the base 10 of the measurement device 1 may provide the pre-stored data related to the container 9 (e.g., the material, thermal conductivity, thickness, weight, the distance between the bottom surface of the container 9 and the weight-measuring area WA of the platform 20) and ambient temperature so as to prevent the container 9 and ambient temperature from affecting the measurement accuracy of the temperature and weight of the substance 90.

For example, in the case that the container 9 is made of paper, the temperatures of the bottom of such container 9 under various ambient temperatures are pre-stored in the memory (not shown) of the measurement device 1, and these pre-stored temperatures can be involved to assist in the determination of the actual temperature of the substance 90 in the container 9.

Optionally, the measurement device 1 may be able to compensate for the difference in manufacturing tolerance existing in different machines used to produce the substance 90. Taking the same type of coffee machine as an example, the user is able to use the measurement device 1 to measure the products (e.g., the substance 90) made by one of the coffee machines and take the measurement results as standard data, and the measurement device 1 can calibrate (e.g., using interpolation) the measure results of the same type of products done by the other coffee machines based on the differences between the coffee machines.

Figure 5:
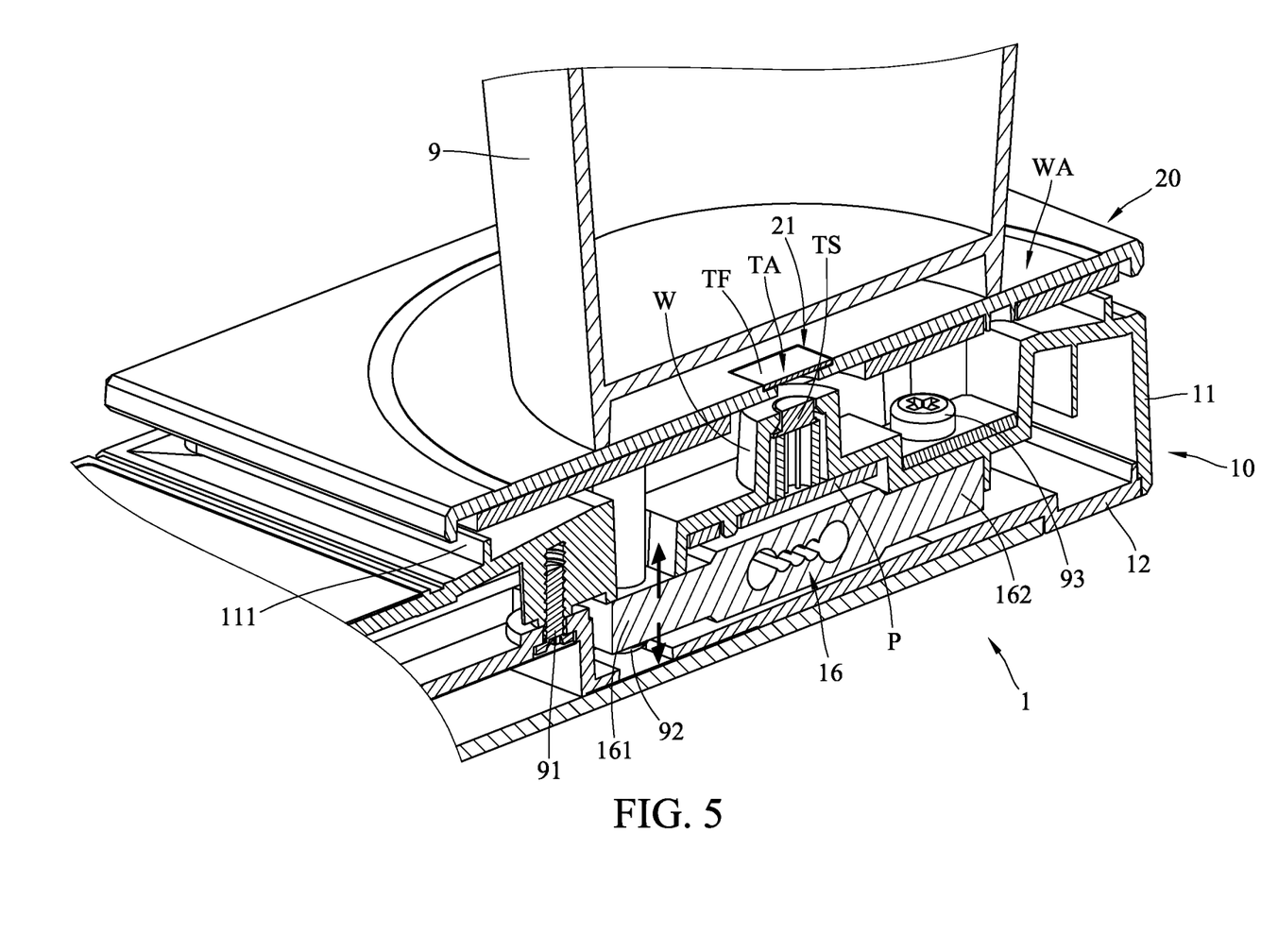
FIG. 5 is an enlarged cross-sectional view of the measurement device in FIG. 1.

The first casing 11 and the second casing 12 may be assembled to each other using screws. Specifically, as shown in FIGS. 5-6, fasteners 91-93 may be disposed through one of the first casing and second casing 12 along a direction substantially parallel to the normal direction N of the platform 20 and screwed into the other of the first casing and second casing 12. That is, the fasteners 91-93 are installed in vertical direction and therefore achieve an easy assembly process of the base 10.

Figure 7:
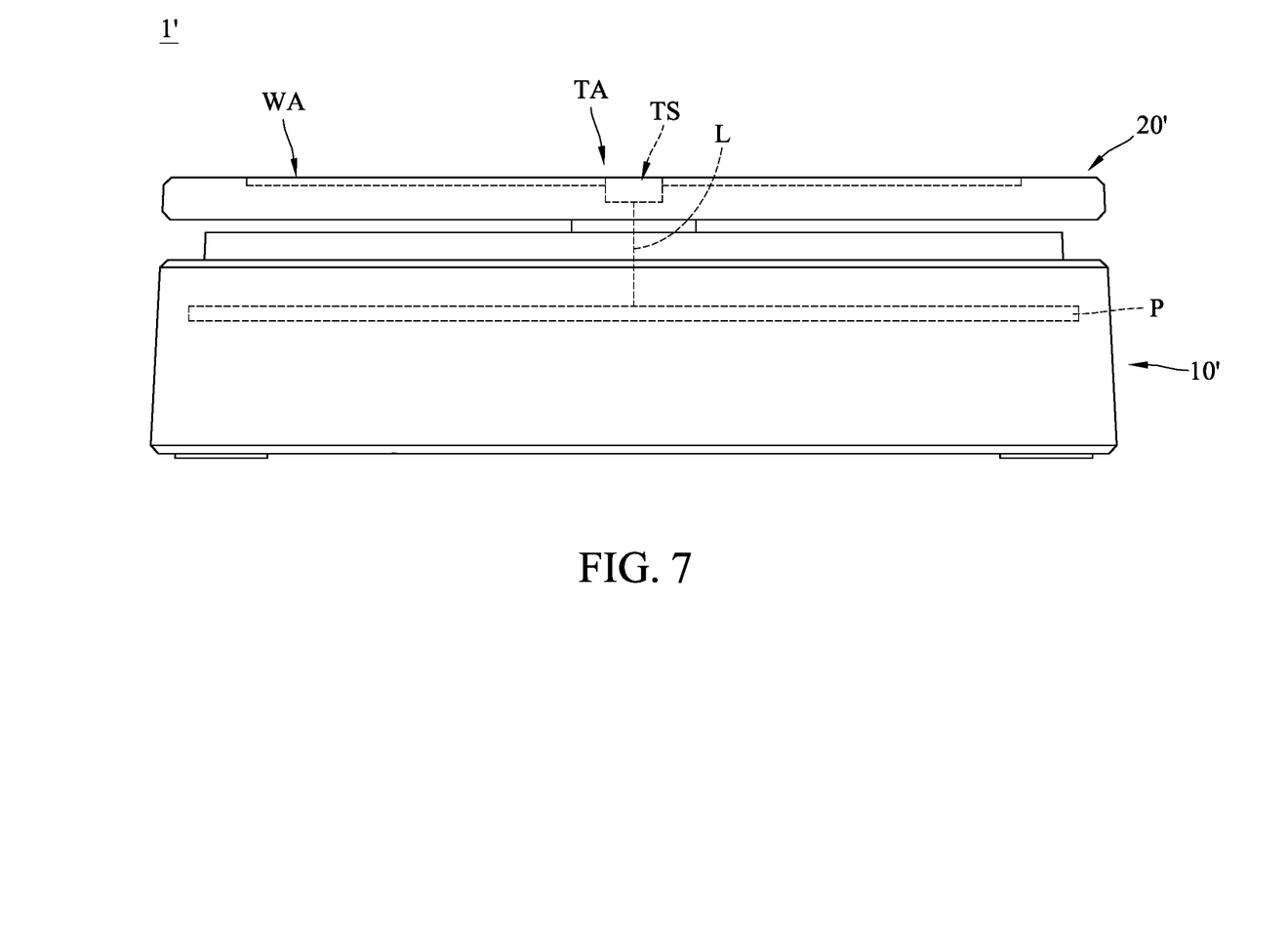
FIG. 7 is a side view of a measurement device according to another embodiment of the disclosure.

It is also noted that the temperature sensor TS is not limited to be arranged in the base 10. For example, please refer to FIG. 7, another embodiment of the disclosure provides a measurement device 1', as shown, the main difference between the measurement device 1' and the previous embodiments is that the temperature sensor TS is arranged at the platform 20' so that the temperature sensor TS is movable relative to the base 10' and located closer to the object placed on the platform 20'. In addition, the temperature sensor TS may be electrically connected to the circuit board P in the base 10' through a cable L. In such an arrangement, the measurement device 1' is still able to measure the temperature and weight of the object placed in the weight-measuring area WA of the platform 20'.

According to the measurement device as discussed in the above embodiments of the disclosure, the temperature sensor has a temperature-measuring area that covers the weight-measuring area of the platform, thus the temperature sensor is able to measure the temperature of the object being placed on the platform while the weighing component is measuring the weight of the object. That is, as an object is placed in the weight-measuring area, the weighing component and the temperature sensor are able to measure the weight and temperature of the object at the same time. Thus, there is no need to neither additionally prepare a temperature sensor nor clean temperature sensor, avoiding troublesome processes during routine work.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:
1. A measurement device comprising:
a base;
a platform movably disposed on the base;
a temperature sensor disposed on the base or the platform; and
a weighing component accommodated in the base;

wherein the platform has a weight-measuring area and a temperature-measuring area which is located within the weight-measuring area and corresponding to the temperature sensor;

wherein the base comprises an insulation wall surrounding at least part of the temperature sensor.

2. The measurement device according to claim 1, wherein the temperature sensor is disposed at the base, the platform has a through hole located at the temperature-measuring area and corresponding to the temperature sensor.

3. The measurement device according to claim 2, wherein the platform is movable within an effective sensing range of the temperature sensor.

4. The measurement device according to claim 2, wherein a distance between the platform and the temperature sensor is changeable.

5. The measurement device according to claim 2, further comprising a metal support arranged on the platform, and the through hole penetrating the metal support.

6. The measurement device according to claim 1, wherein the temperature sensor is an infrared thermometer.

7. The measurement device according to claim 1, further comprising a light-permeable piece located at the temperature-measuring area and located above the temperature sensor.

8. The measurement device according to claim 7, wherein the light-permeable piece is configured to filter a specific range of wavelength.

9. The measurement device according to claim 7, wherein the platform has a supporting portion located at an upper surface thereof, the supporting portion is located in the temperature-measuring area, and the light-permeable piece is arranged on the supporting portion.

10. The measurement device according to claim 9, wherein an upper surface of the light-permeable piece is aligned with the upper surface of the platform.

11. The measurement device according to claim 9, wherein the platform has a through hole located at the temperature-measuring area and connected to the supporting portion, and the through hole is smaller than the light-permeable piece.

12. The measurement device according to claim 1, wherein the temperature-measuring area is smaller than the weight-measuring area.

13. The measurement device according to claim 1, wherein in a normal direction of the platform, the temperature sensor overlaps with the weighing component.

14. The measurement device according to claim 1, wherein the temperature sensor is disposed on the platform, the temperature sensor is electrically connected to a circuit board in the base through a cable.

15. The measurement device according to claim 1, wherein the platform is light-permeable.

16. The measurement device according to claim 1, further comprising a plurality of fasteners, wherein each of the plurality of fasteners is substantially parallel to a normal direction of the platform.

17. The measurement device according to claim 1, further comprising a light-permeable piece, wherein the temperature sensor is disposed at the base, the temperature-measuring area is located at a center of the weight-measuring area, the platform has a through hole located in the temperature-measuring area and corresponding to the temperature sensor, the light-permeable piece is located in the temperature-measuring area and overlapping with the through hole and the temperature sensor; in a normal direction of the platform, the temperature sensor overlaps with the weighing component and a distance between the platform and the temperature sensor is changeable.

* * * * *